(12) United States Patent
Chiu et al.

(10) Patent No.: US 9,389,807 B2
(45) Date of Patent: Jul. 12, 2016

(54) CONFLICT MANAGEMENT FOR APPLICATION DIRECTED DATA PLACEMENT IN STORAGE ENVIRONMENTS

(71) Applicant: INTERNATIONAL BUSINESS MACHINES CORPORATION, Armonk, NY (US)

(72) Inventors: Lawrence Y. Chiu, Saratoga, CA (US); Yang Liu, Shanghai (CN); Mei Mei, Shanghai (CN); Sangeetha Seshadri, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

(21) Appl. No.: 14/162,673

(22) Filed: Jan. 23, 2014

(65) Prior Publication Data
US 2015/0205689 A1 Jul. 23, 2015

(51) Int. Cl.
*G06F 3/06* (2006.01)
*G06F 11/34* (2006.01)

(52) U.S. Cl.
CPC ............. *G06F 3/067* (2013.01); *G06F 3/061* (2013.01); *G06F 3/0605* (2013.01); *G06F 3/0638* (2013.01); *G06F 3/0649* (2013.01); *G06F 11/3409* (2013.01); *G06F 11/3485* (2013.01)

(58) Field of Classification Search
None
See application file for complete search history.

(56) References Cited

U.S. PATENT DOCUMENTS

| 8,381,213 | B1 * | 2/2013 | Naamad | G06F 12/0862 718/100 |
| 8,412,809 | B2 | 4/2013 | Ruan et al. | |
| 9,026,737 | B1 * | 5/2015 | Armangau | G06F 12/0822 711/118 |
| 2007/0083813 | A1 * | 4/2007 | Lui | G06F 11/3612 715/709 |
| 2009/0037452 | A1 | 2/2009 | Baitalmal et al. | |

FOREIGN PATENT DOCUMENTS

| EP | 0301921 A2 * | 2/1989 | ............ G06F 12/084 |
| WO | 2012028957 | 3/2012 | |

* cited by examiner

*Primary Examiner* — Reginald Bragdon
*Assistant Examiner* — James J Thomas
(74) *Attorney, Agent, or Firm* — Rabindranath Dutta; Konrad Raynes Davda & Victor LLP

(57) ABSTRACT

A storage controller receives hints provided by one or more applications over a period of time, wherein the hints are used by the storage controller for organizing data in storage managed by the storage controller. Data on conflicts caused by the provided hints are collected over the period of time. Based on the collected data on the conflicts, one or more conflict avoidance rules are executed to reduce possibility of future conflicts.

18 Claims, 10 Drawing Sheets

Exemplary Conflict Data Collection

- Collect data to identify potential conflict resolution strategies.
- Data collection window = Easy Tier Decision window.
- Data collected at per-extent granularity.
  - # Hint count (total number of hints received for the extent).
  - # Operational conflicts (count of number of hints rejected due to conflict).
  - # Intent conflicts (count of number of hints rejected due to intent conflict).
  - # Conflicting applications (count of number of unique applications that had its hints rejected).
  - Average time between migrations (to measure thrashing).
  - Rate of rejection per application.
  - % of space on extent affected by hints (to calculate "spread" of hints).
  - Relative heat of extent on target tier. (Handle issue to see if the extent ended up in the wrong location due to hint).

CONFLICT MANAGEMENT FOR APPLICATION DIRECTED DATA PLACEMENT IN STORAGE ENVIRONMENTS

BACKGROUND

1. Field

Embodiments relate to conflict management for application directed data placement in storage environments.

2. Background

A storage system may comprise a storage controller that is coupled to a plurality of storage devices. A storage management application that executes in the storage controller may control the plurality of storage devices, and provide access to data stored in the plurality of storage devices to one or more hosts that are coupled to the storage controller. In certain situations, applications that access storage volumes stored in the plurality of storage devices may execute on the storage controller or in the one or more hosts that are coupled to the storage controller.

In an application directed shared storage environment, applications that execute in hosts or the storage controller may provide hints in real-time to guide or dictate storage system functionality such as data placement. Such hints may allow the applications to dynamically configure the storage system to serve the needs of the applications, based on the application's awareness of the end-user performance expectancies, policies, workloads, system events, etc.

The storage management application that executes in the storage controller may act not only based on the hints provided by the applications but also based on the internal system knowledge and policies employed by the storage management application.

In certain situations, a single application may provide conflicting hints for the same data elements (e.g., extents of storage volumes). In other situations, a plurality of applications may provide conflicting hints for the same data elements. As a result there may be poor resource utilization. There may also be wrong placement of the data for some workloads and an inability to meet performance expectations. In operational conflicts, different hints may attempt to move the same extent to different locations to cause a conflict. In intent conflicts, an application may specify different intents for the same extent. It should be noted that intents expressed by applications are converted to operations by the storage controller, and this may cause operational conflicts.

In certain situations, such conflicts may be resolved by certain administrator generated pre-defined policies that are used to break ties and resolve the conflicts. For example, a pre-defined policy may be to prefer Application A over Application B. In conflict resolution mechanisms, the loser in the conflict may have relatively degraded performance and system utilization may suffer.

SUMMARY OF THE PREFERRED EMBODIMENTS

Provided are a method, a system, and a computer program product in which a storage controller receives hints provided by one or more applications over a period of time, wherein the hints are used by the storage controller for organizing data in storage managed by the storage controller. Data on conflicts caused by the provided hints are collected over the period of time. Based on the collected data on the conflicts, one or more conflict avoidance rules are executed to reduce possibility of future conflicts.

In additional embodiments, a determination is made based on the collected data, that thrashing exceeds a threshold level. In response to determining that the thrashing exceeds the threshold level, the storage controller disables hints that correspond to extents that are affected by the thrashing. An automated storage management mechanism of the storage management application is used to manage the selected extents without using the hints corresponding to the selected extents.

In further embodiments, the hints corresponding to the selected extents are disabled for a predetermined period of time and the hints corresponding to the selected extents are enabled after an expiry of the predetermined period of time.

In additional embodiments, a determination is made that hint spread is below a first threshold level and that a target tier in which extents with hints are placed has a utilization level that is below a second threshold level. Caching is used for segments of the extents that have hints indicating that the segments are likely to have relatively high utilization, rather than tiering an entirety of the extents.

In yet additional embodiments, the segments of the extents that have hints indicating that the segments are likely to have relatively high utilization are placed in the target tier without moving the entirety of the extents to the target tier.

In additional embodiments, hints of the extents are disabled, in response to failure of the caching and a failure of the placing of the segments of the extents in the target tier to increase the utilization level to at least the second threshold level.

In certain embodiments, data is reorganized, in response to determining that the conflicts exceed a first threshold, and a number of conflicting applications exceeds a second threshold.

In further embodiments, a reduction is made in a lease window of data if all the conflicting application have same priority. Additionally, higher priority is provided to an application with the highest rejection rate.

BRIEF DESCRIPTION OF THE DRAWINGS

Referring now to the drawings in which like reference numbers represent corresponding parts throughout:

FIG. 3 illustrates a block diagram that shows exemplary conflict data collection, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Certain embodiments provide mechanisms to avoid conflicts caused by conflicting hints. By adopting mechanisms to avoid conflict resolution, the likelihood of actually being forced to perform conflict resolution is decreased and as a result system efficiency may be increased.

Exemplary Embodiments

Figure 1:
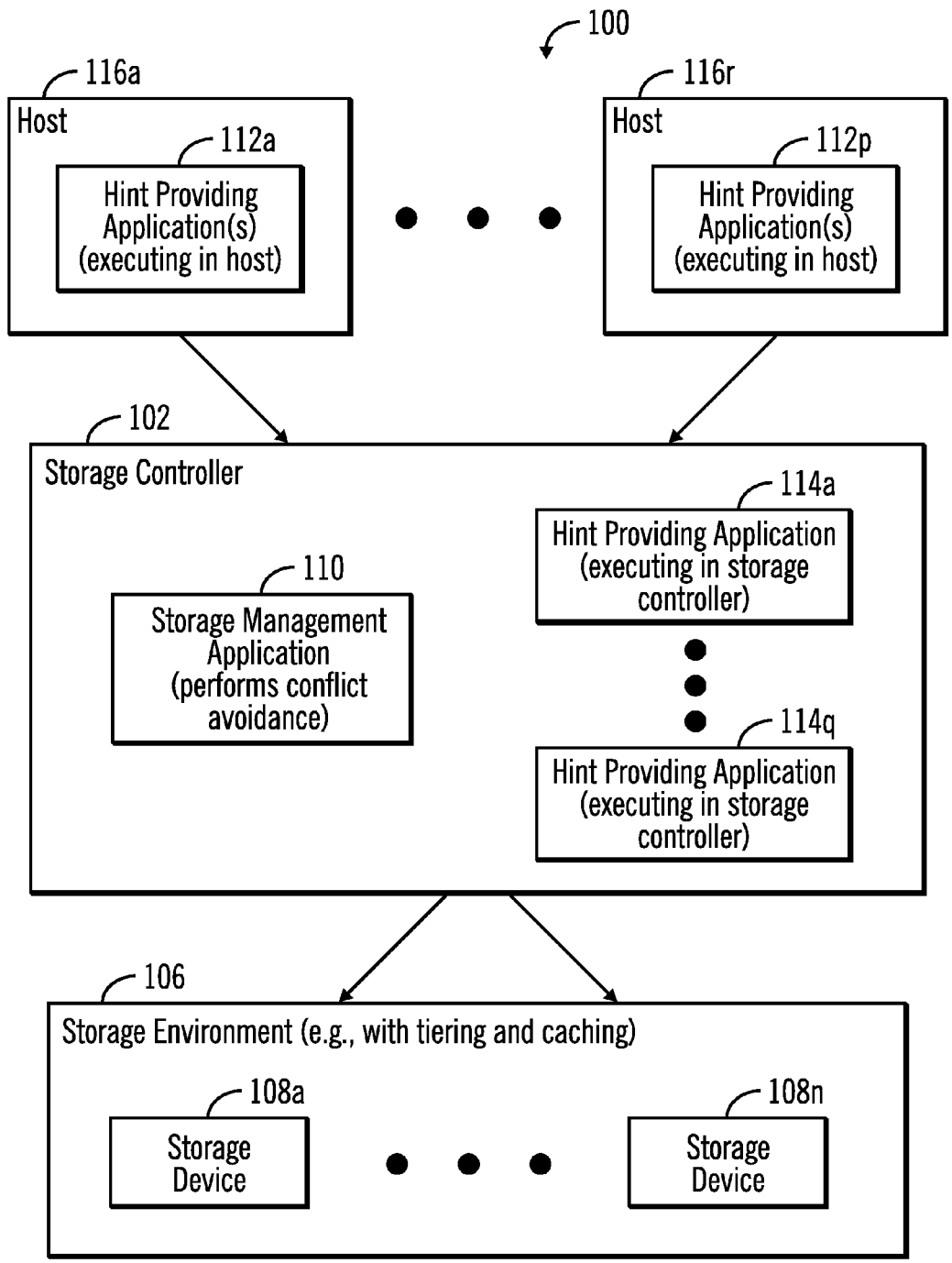
FIG. 1 illustrates a block diagram of a computing environment, in accordance with certain embodiments.

FIG. 1 illustrates a block diagram of a first computing environment 100, in accordance with certain embodiments. In FIG. 1, a storage controller 102 controls a storage environment 106 comprising a plurality of storage devices 108a . . . 108n. The storage controller 102 may comprise any suitable computational device known in the art, such as a mainframe computer, a midrange computer, a personal computer, a tablet device, a handheld device, a telephony device, a storage blade, a server, a processing element, etc.

In certain embodiments, the storage environment 106 may comprise a tiered storage environment and may also include a cached storage environment. In a tiered storage environment, some of the storage devices may be grouped in a plurality of tiers, for example a first storage tier, a second storage tier, and a third storage tier where the first storage tier is comprised of solid state disks, the second storage tier is comprised of enterprise drives, such as fibre channel (FC) or Serial Attached SCSI (SAS) drives in the 10-15K RPM (rotations per minute) range, and the third storage tier is comprises nearline drives with higher capacity but slower RPM (e.g., 7200 RPM) drives in comparison to the enterprise drives. It should be noted that the types of storage devices stored in the different storage tiers may be different in alternative embodiments. In certain embodiments, the first storage tier has a higher performance but lower storage capacity than the second storage tier, and the second storage tier has a higher performance but lower storage capacity than the third storage tier.

The storage maintained in the storage environment may be represented as volumes by a storage management application 110 that executes in the storage controller 102. The unit of storage may comprise an extent in certain embodiments and a volume may have a plurality of extents. Extents may be moved between tiers, and certain data stored in extents may be staged and destaged from cache storage.

The storage management application 110 may provide access to the storage environment 106 to a plurality of applications 112a . . . 112p, 114a . . . 114q that execute in a plurality of hosts 116a . . . 116r and the storage controller 102. The application 112 . . . 112p, 114a . . . 114p may also be termed hint providing applications as they provide hints that are used by the storage management application 110 for placement of data and organization of data in the storage environment 106. In certain embodiments, in the process of interpreting hints the storage management application 110 performs conflict avoidance.

Therefore, FIG. 1 illustrates certain embodiments in which a storage management application 110 that executes in the storage controller 102 receives hints from a plurality of applications 112a . . . 112p, 114a . . . 114q, and performs conflict avoidance in the placement and organization of data in the storage environment 106.

Figure 2:
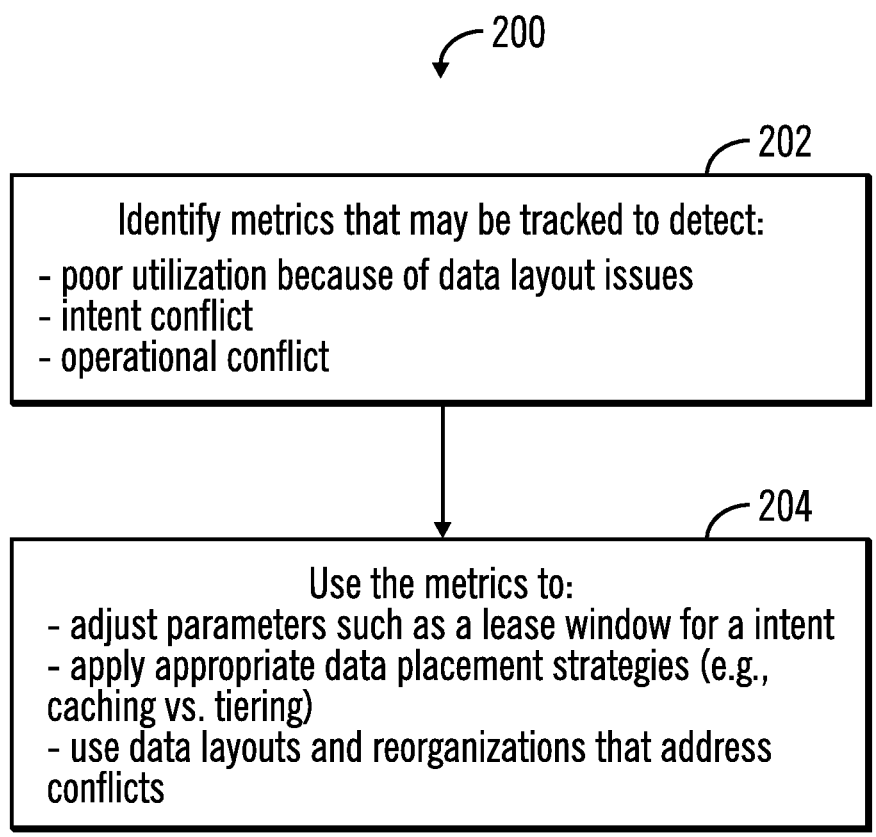
FIG. 2 illustrates a first flowchart for conflict avoidance, in accordance with certain embodiments.

FIG. 2 illustrates a first flowchart 200 for conflict avoidance, in accordance with certain embodiments. In certain embodiments, the operations shown in FIG. 2 may be performed by the storage management application 110 that executes in the storage controller 110.

Control starts at block 202 in which the storage management application 110 is programmed to identify metrics that may be tracked to detect poor utilization of the storage environment 106 because of data layout issues, intent conflicts or operational conflicts.

Control proceeds to block 204, in which the metrics are used by the storage management application 110 to adjust parameters such as a lease window for an intent (i.e., hint), where a lease window for an intent is the time period for which the intent is applicable. For example, an intent provided by an application may request placement of certain data of the application on solid state disks on Monday to Friday during office hours when the data is likely to be used most.

In block 204, the storage management application 110 may also apply data placement strategies. For example, caching may be used for certain data, whereas tiering may be used for other data.

In block 204, the storage management application 110 may also use data layouts and reorganization of data that address the avoidance of conflicts caused by conflicting hints provided by the hint providing applications.

FIG. 3 illustrates a block diagram 300 that shows exemplary conflict data collection, in accordance with certain embodiments. The collection of exemplary conflict data may be performed over a period of time and may be regarded as a learning mechanism for reducing future likelihood of conflicts.

Various representative conflict data collection mechanisms are shown in FIG. 3. They include collection of data to identify potential conflict resolution strategies. Data collection window based on tiering may also be used. Data may be collected in certain embodiments at the granularity of an extent, and various measures may be aggregated.

Such measures may include hint counts on the total number of hints received for an extent and operational conflict counts on the number of hints rejected due to conflict. Such measures may also include intent conflict counts that include the number of hints rejected due to intent conflicts. Track may also be kept of the number of conflicting applications, i.e., the number of unique application whose hints have been rejected. Average time between migrations may also be kept track of to measure thrashing. The rate of rejection per application may be kept track of. In certain embodiment, the percentage of an extent affected by hints (which comprises the spread of hints) may be measured. If a hint affects 1 kilobyte when an extent is 1 megabyte, then only 0.1% of the extent is affected by the hint and this is referred to as the spread of the hint. In certain embodiments, the relative heat (i.e., frequency of use) of the extent on a target tier (e.g. a solid state disk tier) may be measured.

Once the various statistics shown in FIG. 3 are collected by the storage management application 110, then the statistics are interpreted for conflict avoidance.

Figure 4:
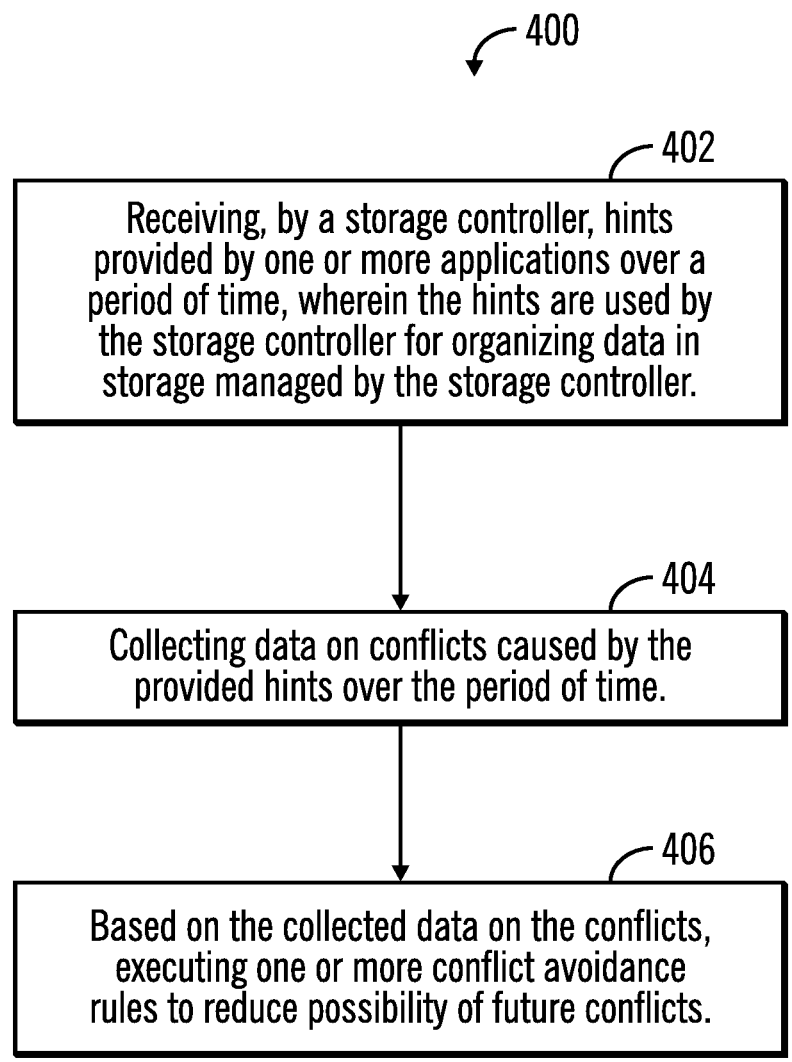
FIG. 4 illustrates a second flowchart for conflict avoidance, in accordance with certain embodiments.

FIG. 4 illustrates a second flowchart 400 for conflict avoidance, in accordance with certain embodiments. In certain embodiments, the operations shown in FIG. 4 may be performed by the storage management application 110 that executes in the storage controller 110.

Control starts at block 402 in which a storage controller 102 receives hints provided by one or more applications 112a ... 112p, 114a ... 114q over a period of time, where the hints are used by the storage controller 102 for organizing data in storage 106 managed by the storage controller 102. Data on conflicts caused by the provided hints are collected (at block 404) over the period of time. Based on the collected data on the conflicts, one or more conflict avoidance rules are executed (at block 406) to reduce the possibility of future conflicts. The conflict avoidance rules may be based on the amount of thrashing, hint spreads, the number of conflicting applications or other factors.

Figure 5:
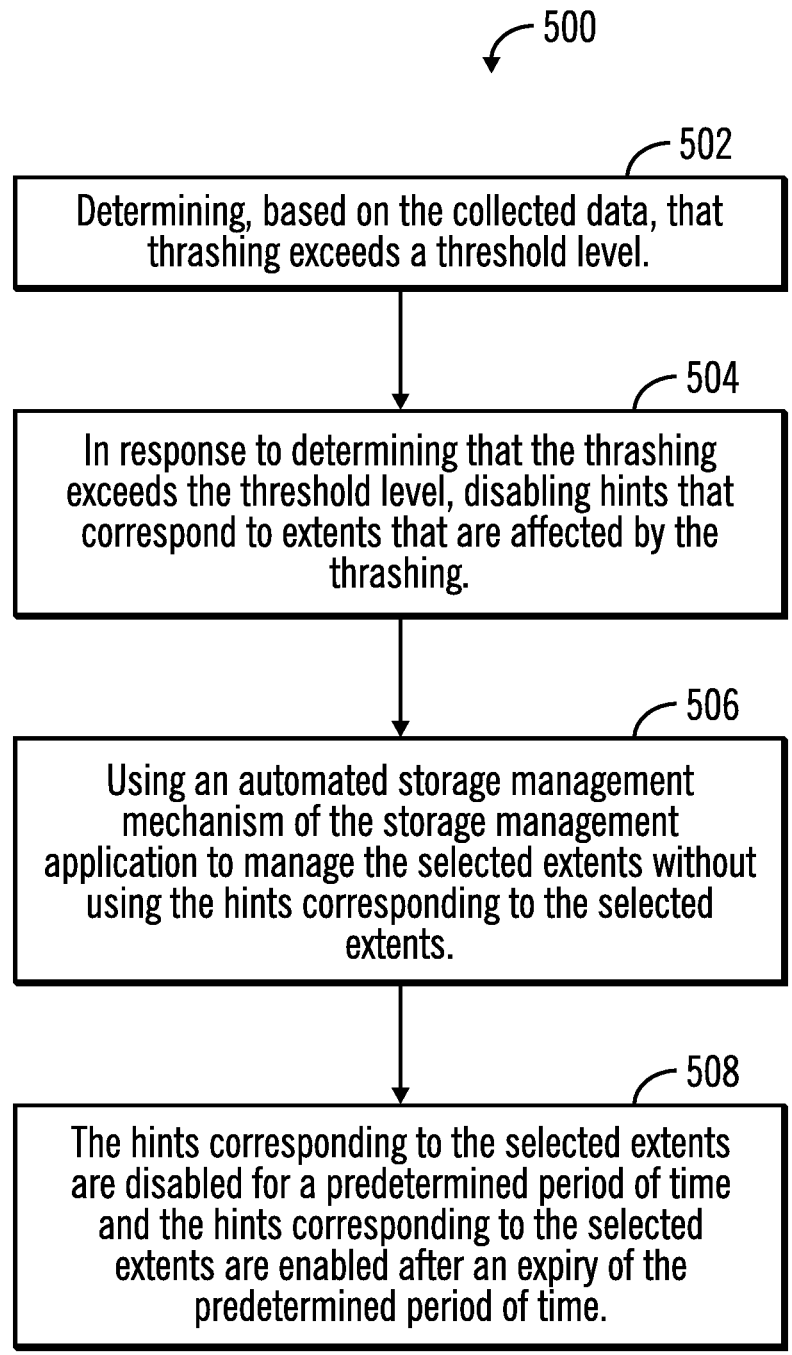
FIG. 5 illustrates a third flowchart for conflict avoidance based on a level of thrashing, in accordance with certain embodiments.

FIG. 5 illustrates a third flowchart 500 for conflict avoidance based on a level of thrashing, in accordance with certain embodiments. In certain embodiments, the operations shown in FIG. 5 may be performed by the storage management application 110 that executes in the storage controller 110.

Control starts at block 502, in which a determination is made based on the collected data, that thrashing (i.e., movement of extents) exceeds a threshold level. In response to determining that the thrashing exceeds the threshold level, the storage controller disables (at block 504) hints that correspond to extents that are affected by the thrashing.

Control proceeds to block 506, in which an automated storage management mechanism of the storage management application 110 is used to manage the selected extents without using the hints corresponding to the selected extents. The hints corresponding to the selected extents are disabled (at block 508) for a predetermined period of time and the hints corresponding to the selected extents are enabled after an expiry of the predetermined period of time.

Figure 6:
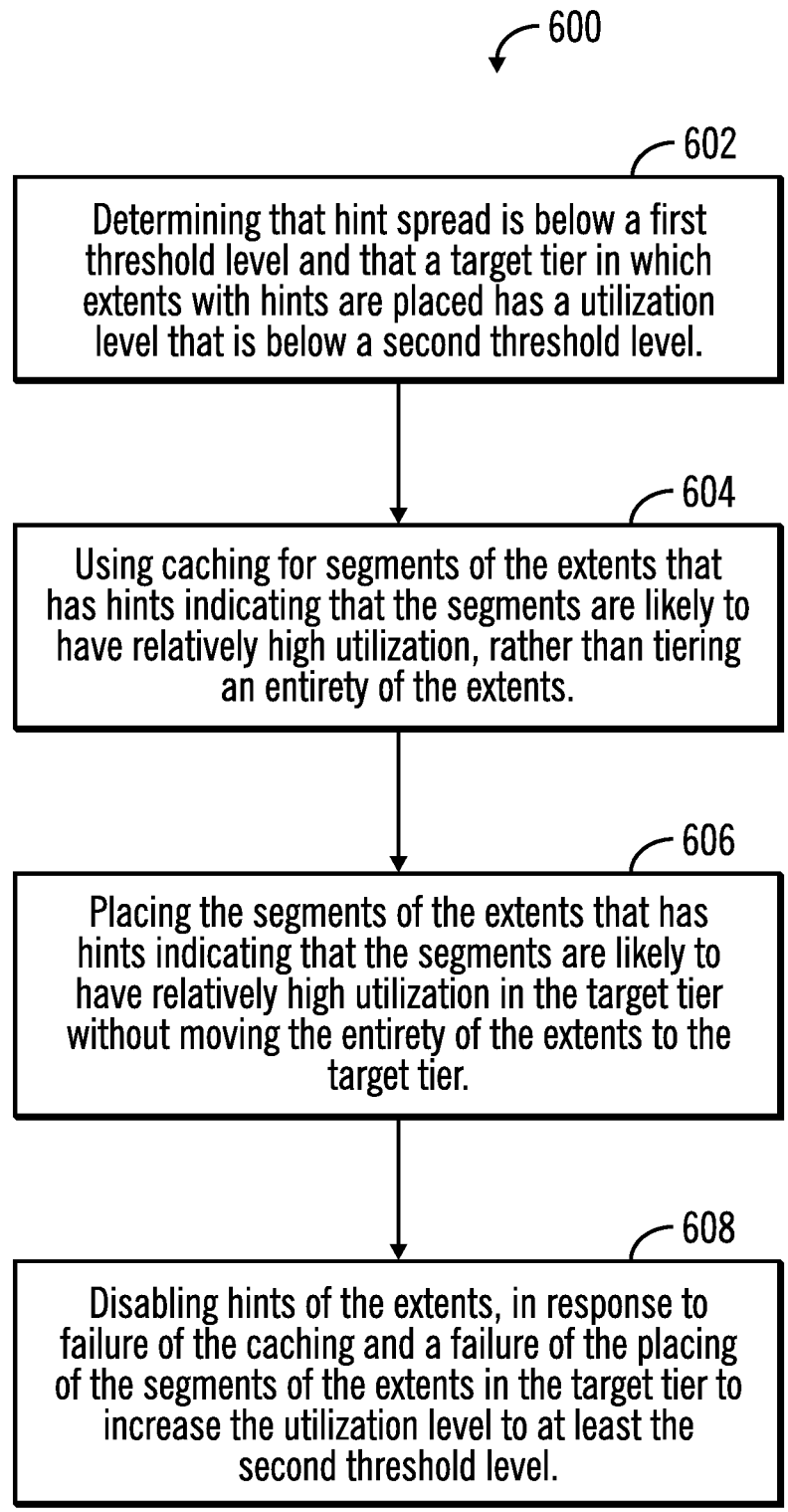
FIG. 6 illustrates a fourth flowchart for conflict avoidance based on hint spread and utilization level of tiers, in accordance with certain embodiments.

FIG. 6 illustrates a fourth flowchart 600 for conflict avoidance based on hint spread and utilization level of tiers, in accordance with certain embodiments. In certain embodiments, the operations shown in FIG. 6 may be performed by the storage management application 110 that executes in the storage controller 110.

Control starts at block 602 in which a determination is made that that hint spread is below a first threshold level and that a target tier in which extents with hints are placed has a utilization level that is below a second threshold level. Caching is used (at block 604) for segments of the extents that has hints indicating that the segments are likely to have relatively high utilization, rather than tiering an entirety of the extents.

Control proceeds to block 606, in which the segments of the extents that have hints indicating that the segments are likely to have relatively high utilization are placed in the target tier (e.g., a solid state disk tier) without moving the entirety of the extents to the target tier. Hints of the extents are disabled (at block 608), in response to failure of the caching and a failure of the placing of the segments of the extents in the target tier to increase the utilization level to at least the second threshold level.

Figure 7:
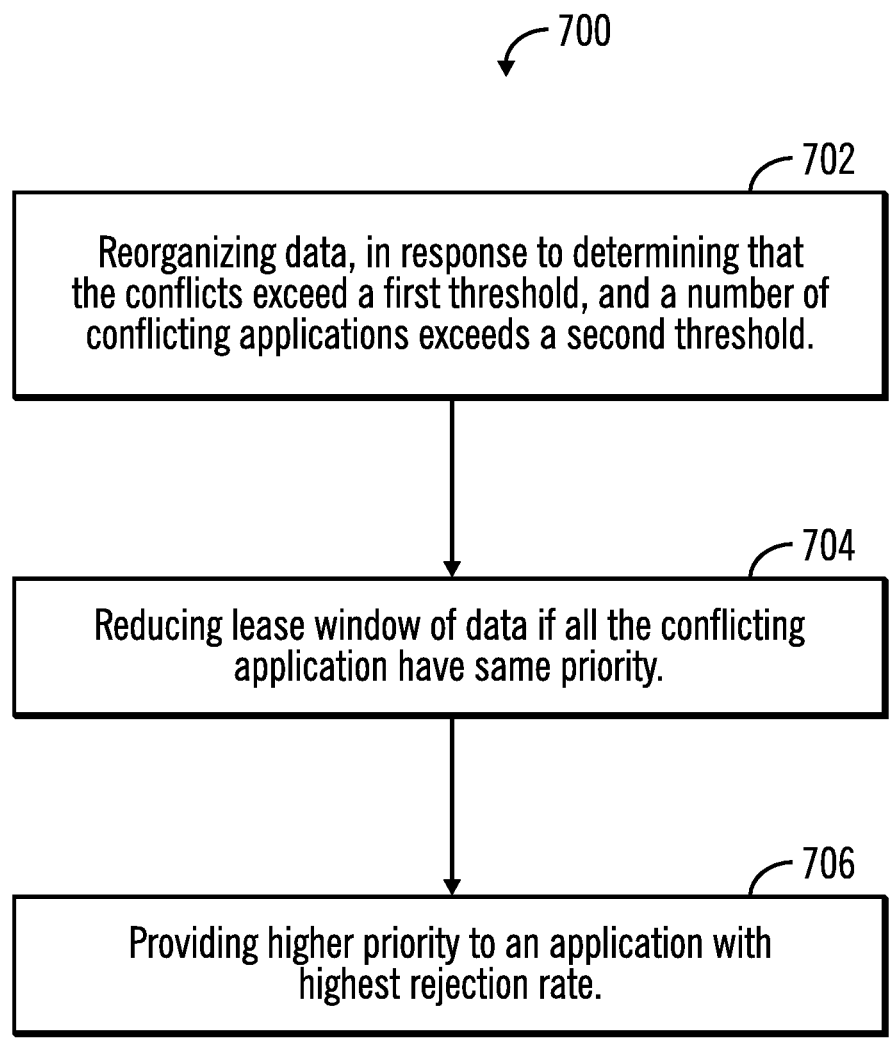
FIG. 7 illustrates a fifth flowchart for conflict avoidance based at least on the number of applications, in accordance with certain embodiments.

FIG. 7 illustrates a fifth flowchart 700 for conflict avoidance based at least on the number of applications, in accordance with certain embodiments. In certain embodiments, the operations shown in FIG. 7 may be performed by the storage management application 110 that executes in the storage controller 110.

Control starts at block 702 in which data is reorganized, in response to determining that the conflicts exceed a first threshold, and a number of conflicting applications exceeds a second threshold. Control proceeds to block 704, in which a reduction is made in a lease window of data if all the conflicting application have same priority and a round robin scheduling mechanism for hints of the applications may be used for fairness. Additionally, higher priority is provided (at block 706) to an application with highest rejection rate or a combination of round-robin scheduling and scheduling based on rejection rate may be used.

In certain additional embodiments an alternate location for a selected applications data may be proposed. If an application can provide data entity and logical address via the hints, then the storage management application 110 may perform the reorganization and provide the new logical address along with the data entity for easier lookup.

Therefore, FIGS. 1-7 provide certain mechanisms by which a storage management application avoids conflict in managing storage, when conflicting hints are provided by one or more applications.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
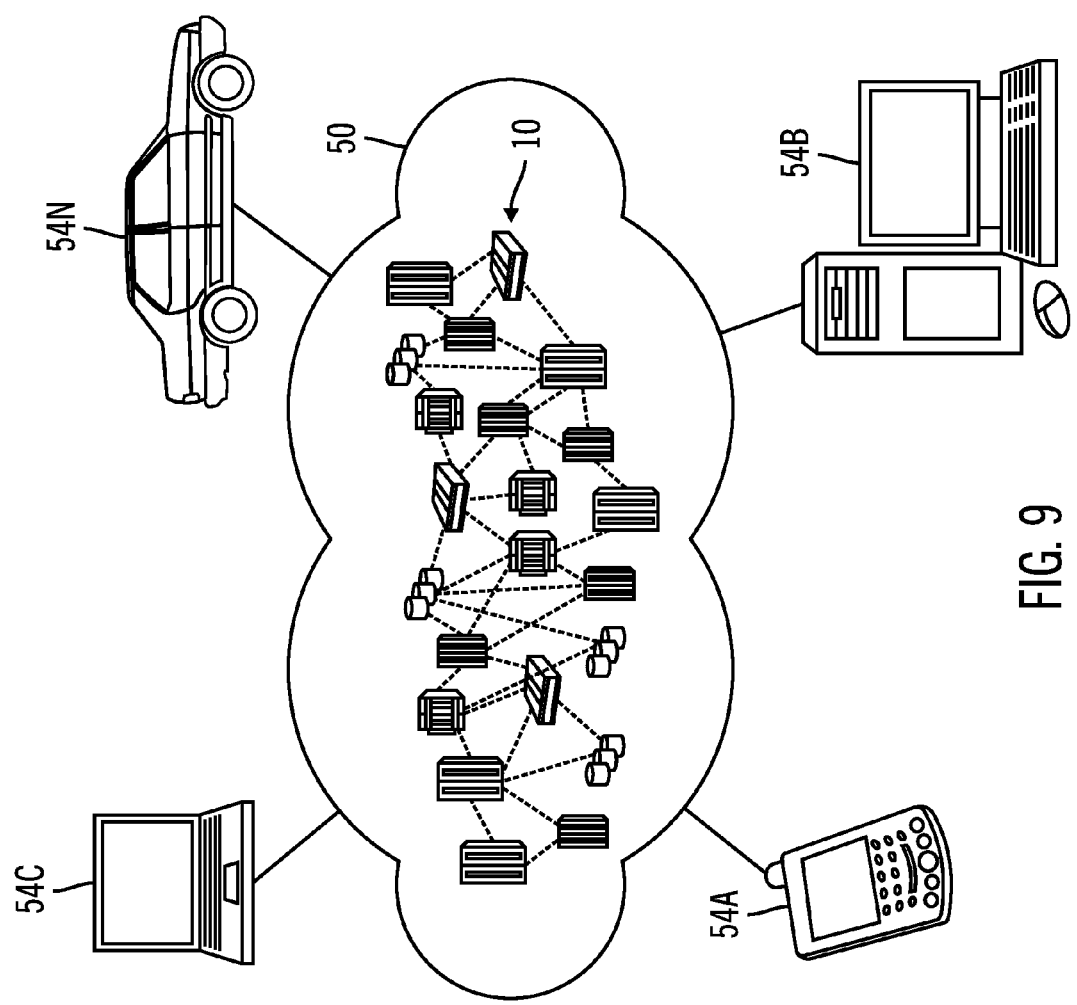
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
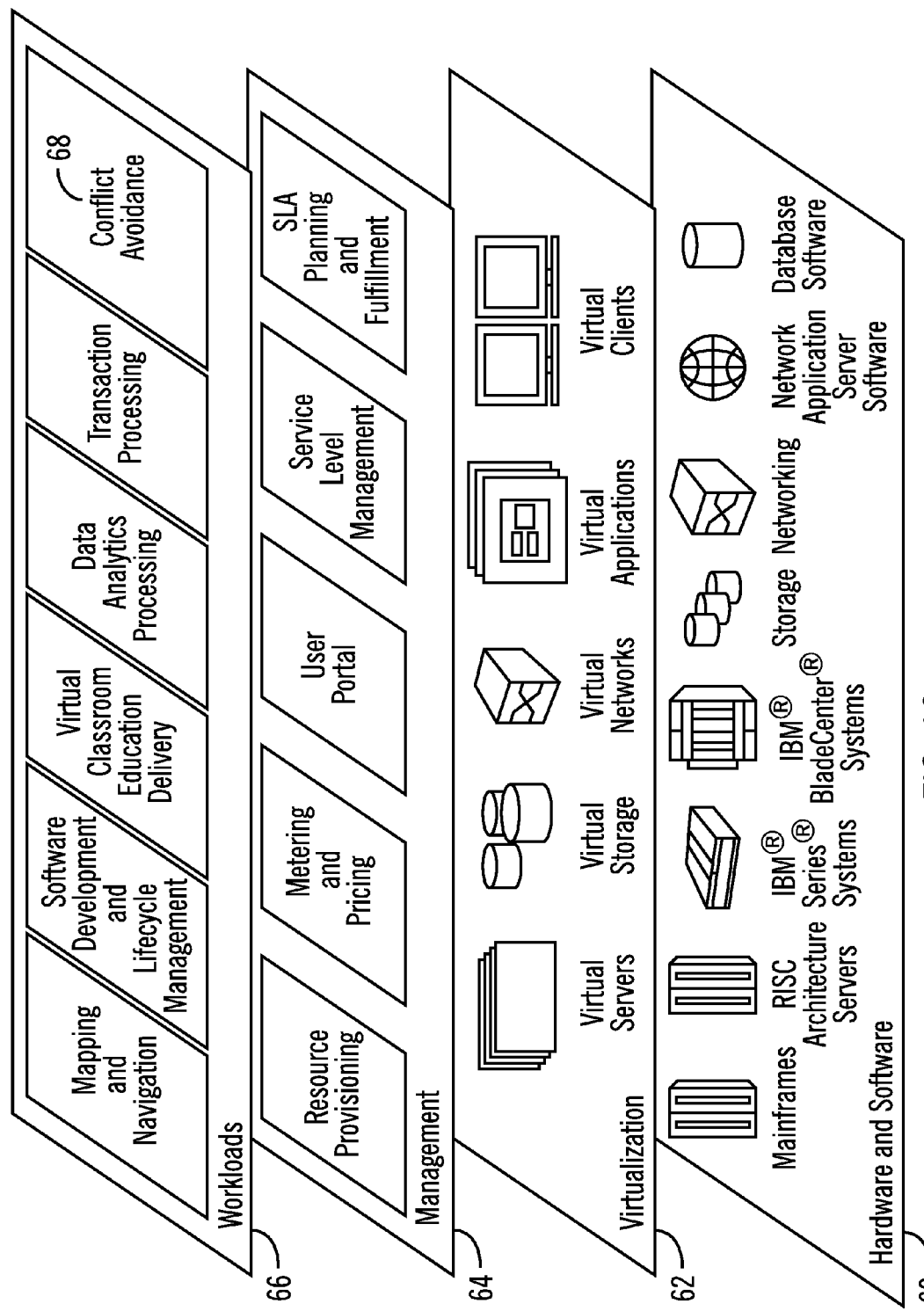
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and conflict avoidance 68 in the presence of hints as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java, JavaScript are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
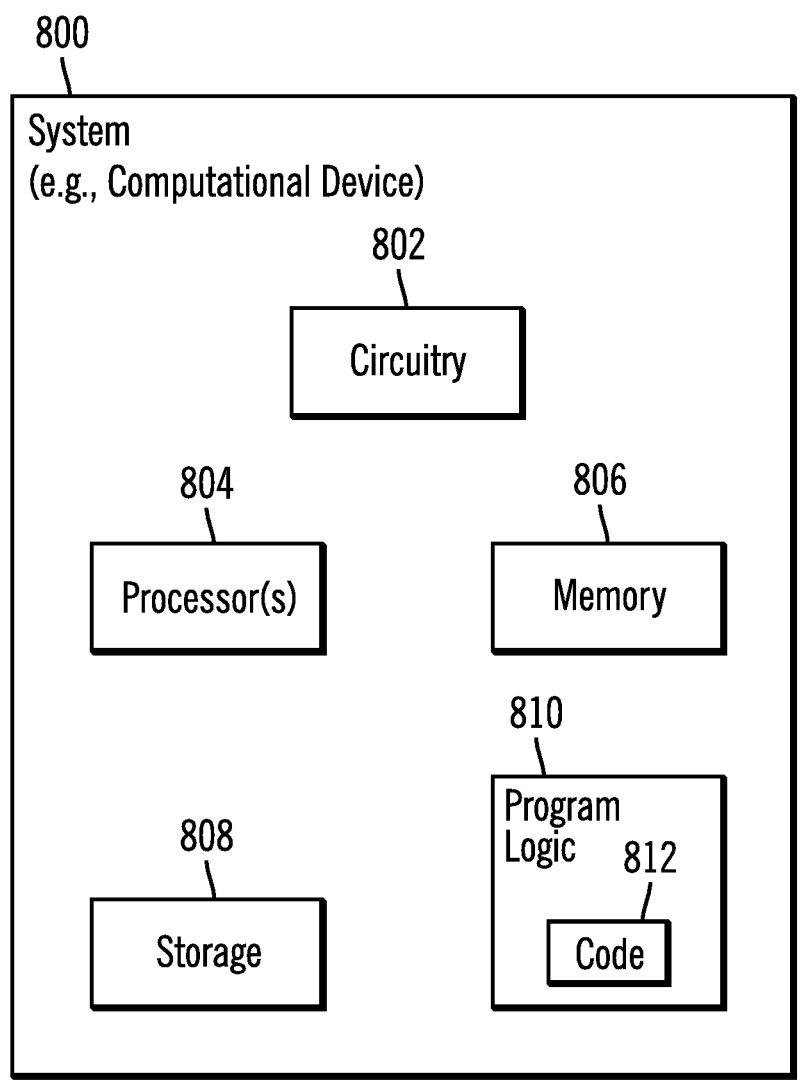
FIG. 8 illustrates a block diagram of a computational system that shows certain elements that may be included in the storage controller or the host of FIG. 1, in accordance with certain embodiments.

FIG. 8 illustrates a block diagram that shows certain elements that may be included in the storage controller 102 in accordance with certain embodiments. The system 800 (e.g., a computational device, such as the storage controller 202 and/or the host 220) may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving, by a storage controller, hints provided by one or more applications over a period of time, wherein the hints are used by the storage controller for organizing data in storage managed by the storage controller;
   collecting data on conflicts caused by the provided hints over the period of time; and
   based on the collected data on the conflicts, executing one or more conflict avoidance rules to reduce possibility of future conflicts, wherein the method further comprises:
   reorganizing data, in response to determining that the conflicts exceed a first threshold, and a number of conflicting applications exceeds a second threshold;
   reducing lease window of data if all the conflicting applications have same priority; and
   providing higher priority to an application with highest rejection rate.

2. The method of claim 1, the method further comprising:
   determining, based on the collected data, that thrashing exceeds a threshold level;
   in response to determining that the thrashing exceeds the threshold level, disabling hints that correspond to extents that are affected by the thrashing; and
   using an automated storage management mechanism of the storage management application to manage the selected extents without using the hints corresponding to the selected extents.

3. The method of claim 2, wherein the hints corresponding to the selected extents are disabled for a predetermined period of time and the hints corresponding to the selected extents are enabled after an expiry of the predetermined period of time.

4. The method of claim 1, the method further comprising:
   determining that hint spread is below a first threshold level and that a target tier in which extents with hints are placed has a utilization level that is below a second threshold level;
   using caching for segments of the extents that have hints indicating that the segments are likely to have relatively high utilization, rather than tiering an entirety of the extents.

5. The method of claim 4, the method further comprising:
placing the segments of the extents that have hints indicating that the segments are likely to have relatively high utilization in the target tier without moving the entirety of the extents to the target tier.

6. The method of claim 5, the method further comprising:
disabling hints of the extents, in response to failure of the caching and a failure of the placing of the segments of the extents in the target tier to increase the utilization level to at least the second threshold level.

7. A storage controller, comprising:
a memory; and
a processor coupled to the memory, wherein the processor performs operations, the operations comprising:
receiving, hints provided by one or more applications over a period of time, wherein the hints are used by the storage controller for organizing data in storage managed by the storage controller;
collecting data on conflicts caused by the provided hints over the period of time; and
based on the collected data on the conflicts, executing one or more conflict avoidance rules to reduce possibility of future conflicts, the operations further comprising:
reorganizing data, in response to determining that the conflicts exceed a first threshold, and a number of conflicting applications exceeds a second threshold;
reducing lease window of data if all the conflicting applications have same priority; and
providing higher priority to an application with highest rejection rate.

8. The storage controller of claim 7, the operations further comprising:
determining, based on the collected data, that thrashing exceeds a threshold level;
in response to determining that the thrashing exceeds the threshold level, disabling hints that correspond to extents that are affected by the thrashing; and
using an automated storage management mechanism of the storage management application to manage the selected extents without using the hints corresponding to the selected extents.

9. The storage controller of claim 8, wherein the hints corresponding to the selected extents are disabled for a predetermined period of time and the hints corresponding to the selected extents are enabled after an expiry of the predetermined period of time.

10. The storage controller of claim 7, the operations further comprising:
determining that hint spread is below a first threshold level and that a target tier in which extents with hints are placed has a utilization level that is below a second threshold level;
using caching for segments of the extents that have hints indicating that the segments are likely to have relatively high utilization, rather than tiering an entirety of the extents.

11. The storage controller of claim 10, the operations further comprising:
placing the segments of the extents that have hints indicating that the segments are likely to have relatively high utilization in the target tier without moving the entirety of the extents to the target tier.

12. The storage controller of claim 11, the operations further comprising:
disabling hints of the extents, in response to failure of the caching and a failure of the placing of the segments of the extents in the target tier to increase the utilization level to at least the second threshold level.

13. A computer program product, the computer program product comprising:
a non-transitory computer readable storage medium having computer readable program code embodied therewith, the computer readable program code configured to perform operations on a processor, the operations comprising:
receiving, by a storage controller, hints provided by one or more applications over a period of time, wherein the hints are used by the storage controller for organizing data in storage managed by the storage controller;
collecting data on conflicts caused by the provided hints over the period of time; and
based on the collected data on the conflicts, executing one or more conflict avoidance rules to reduce possibility of future conflicts, the operations further comprising:
reorganizing data, in response to determining that the conflicts exceed a first threshold, and a number of conflicting applications exceeds a second threshold;
reducing lease window of data if all the conflicting applications have same priority; and
providing higher priority to an application with highest rejection rate.

14. The computer program product of claim 13, the operations further comprising:
determining, based on the collected data, that thrashing exceeds a threshold level;
in response to determining that the thrashing exceeds the threshold level, disabling hints that correspond to extents that are affected by the thrashing; and
using an automated storage management mechanism of the storage management application to manage the selected extents without using the hints corresponding to the selected extents.

15. The computer program product of claim 14, wherein the hints corresponding to the selected extents are disabled for a predetermined period of time and the hints corresponding to the selected extents are enabled after an expiry of the predetermined period of time.

16. The computer program product of claim 13, the operations further comprising:
determining that hint spread is below a first threshold level and that a target tier in which extents with hints are placed has a utilization level that is below a second threshold level;
using caching for segments of the extents that have hints indicating that the segments are likely to have relatively high utilization, rather than tiering an entirety of the extents.

17. The computer program product of claim 16, the operations further comprising:
placing the segments of the extents that have hints indicating that the segments are likely to have relatively high utilization in the target tier without moving the entirety of the extents to the target tier.

18. The computer program product of claim 17, the operations further comprising:
disabling hints of the extents, in response to failure of the caching and a failure of the placing of the segments of the extents in the target tier to increase the utilization level to at least the second threshold level.

* * * * *